June 6, 1933.  F. H. WHITMAN  1,912,419
FLASH REMOVING APPARATUS
Filed Feb. 17, 1928
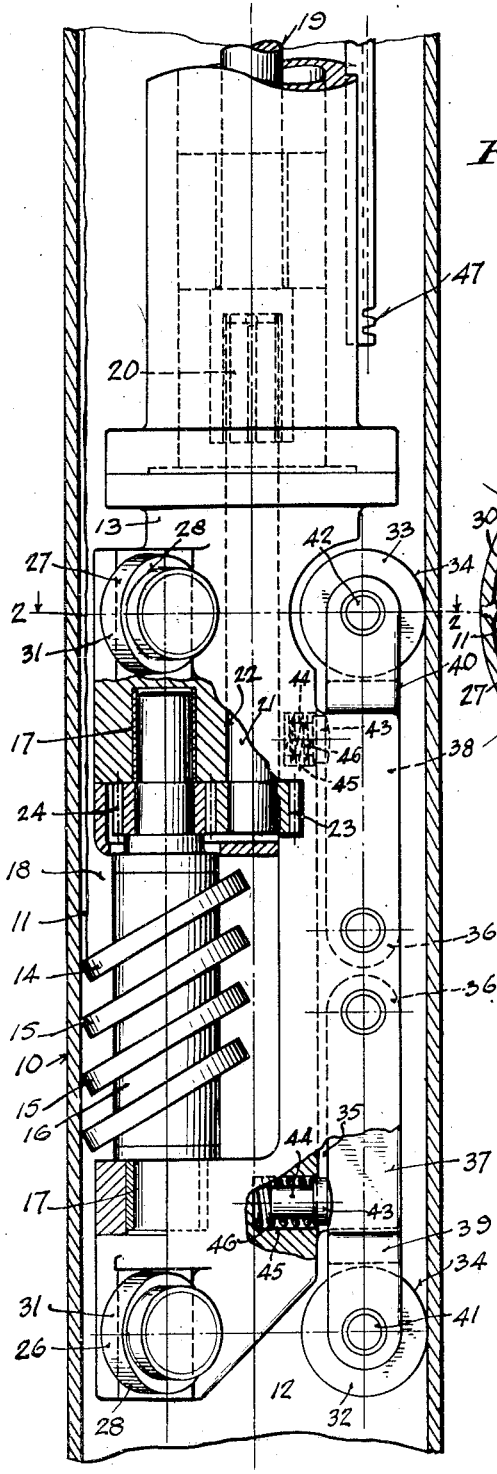
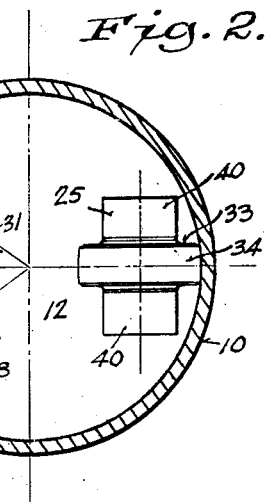
INVENTOR.
FRED H. WHITMAN
BY
ATTORNEY.

Patented June 6, 1933

1,912,419

UNITED STATES PATENT OFFICE

FRED H. WHITMAN, OF MILWAUKEE, WISCONSIN, ASSIGNOR TO A. O. SMITH CORPORATION, OF MILWAUKEE, WISCONSIN, A CORPORATION OF NEW YORK

FLASH REMOVING APPARATUS

Application filed February 17, 1928. Serial No. 254,928.

The invention relates to an apparatus for the removal of flash or other obstructions upon the internal surfaces of tubular articles and more especially adapted to remove the flash which customarily accumulates upon the inner surface of a pipe along the line of a welded seam thereof.

The novel apparatus invented by me essentially consists of a unit capable of being propelled through a pipe and having a working element mounted thereon and adapted to directly attack obstructions, such as flash, upon the internal surface of said pipe as the unit advances, to thus remove such obstructions from the pipe surface.

In practice, portions of the internal surface of the pipe define cylindrical limiting walls of a directing channel which portions are parallel with a longitudinal width or strip of said internal surface to be attacked by said working element, and the unit includes mechanism devised to engage and ride along said limiting wall and constructed to cause the working element to operate upon said longitudinal width or strip as the unit moves along.

The general nature of my invention having thus been outlined, I shall now fully and specifically describe the various features thereof, and point out the novelty of the invention in the claims appended to this specification.

Fig. 1 is an elevational sectional view of a pipe having an internal flash to be removed, disclosing in elevation and partially sectioned and broken away, an apparatus made in accordance with the invention and as applied to use.

Fig. 2 is a transverse sectional view of the pipe, on line 2—2 in Fig. 1, disclosing fragments of the apparatus at the location of the section line.

A pipe 10 from the internal surface of which obstructions are to be removed, as, for example, a flash 11 disclosed as accumulated along a longitudinal width or strip of the pipe at the inner surface of a welded seam thereof, is stably supported in any suitable manner while the novel apparatus, represented generally at 12, is propelled through the pipe and caused to attack said obstructions, or flash and displace them from said pipe. The pipe disclosed in the drawing may be considered as either vertically or horizontally positioned. It could, however, just as well be obliquely located.

A frame or unit 13 of the apparatus, of general cylindrical shape, if of dimension to be freely passable through the pipe 10, and is provided with a working element 14 set up to attack a longitudinal width or strip having obstructions, such as the flash 11, upon the internal surface of the pipe 10.

As disclosed, the working element 14 consists of suitable cutters 15 rigid upon a longitudinally disposed and rotatable axis 16 mounted against endwise play in bearings 17 of the frame or unit at a cut-away portion 18 thereof.

Driving mechanism for the axis 16 consists of a flexible shaft 19 coupled in ordinary manner, as at 20, to a longitudinally disposed and rotatable shaft 21 suitably fixed against endwise play in a bearing 22 of the frame 13 and parallel with the cutter axis, and an ordinary gear 23 fixed upon said shaft 21 and meshing with a similar gear 24 fixed upon an end portion of the cutter axis adjacent a bearing thereof. The gear guard disclosed may or may not be utilized.

A portion of the internal surface of the pipe defines a cylindrical limiting wall of a directing channel which is parallel with the longitudinal width or strip of flash 11 to be attacked and removed by the working element 14, and the frame or unit supports mechanism, represented generally at 25, adapted to engage and ride along this limiting wall in such manner as to cause the cutters of the working element to operate upon said longitudinal width or strip as the unit advances.

Longitudinally spaced sets of rollers, designated 26 and 27, of said mechanism 25, are situated adjacent opposite end portions of the cutter axis 16, and each of said sets 26, 27 consists of transversely spaced apart and aligned rollers, designated 28 and 29, suitably mounted on angularly related stems 30 fixed in the frame or unit 13. The rollers 28 and 29, respectively, of each set are disposed at opposite sides of and adjacent the cutter axis in equally spaced relation thereto, to thus situate the rollers 28, 28 and 29, 29 of the different sets in longitudinal alignment.

The peripheral surfaces 31 of all of the rollers 28 and 29 desirably have the concentricity of the internal surface of the pipe and are so constructed and related to each other that they engage said internal surface, in the manner as best disclosed in Fig. 2, to be ridable through the pipe in longitudinal lines equally spaced from and parallel with a width or strip, such as the flash 11, to be attacked and removed. And the working faces of the cutters 15 desirably lie in the plane of the cylindrical internal surface of the pipe when said rollers 28 and 29 are engaging said internal surface, to thus be capable of completely removing flash or other obstruction from said surface, but incapable of altering or marring its cylindrical contour, as will be evident.

Longitudinally spaced and aligned rollers 32 and 33 of the mechanism 25, disposed diametrically opposite the cutter axis and in transverse alignment with the sets of rollers 26 and 27, respectively, are adapted to engage the internal surface of the pipe 10 to yieldingly urge the rollers 28 and 29 toward said internal surface to thus position the faces of the cutters into working engagement with the obstructions, or flash 11 to be removed. The peripheral surfaces 34 of said rollers 32 and 33 also have the concentricity of the internal surface of the pipe and are set to be ridable longitudinally through said pipe in a line diametrically opposite cutter axis. The specific manner in which I mount the rollers 32 and 33 upon the frame or unit 13 so that said rollers can urge the working element toward the longitudinal width or strip to be attacked, is best disclosed in Fig. 1. As there shown, the frame or unit has a guide slot 35 arranged opposite the cutter axis and providing spaced walls between which the inner ends 36 of aligning and oppositely extending arms, denoted 37 and 38, are pivotally supported to swing from and toward said frame or unit. Outer bifurcated portions, denoted 39 and 40, of said arms are positioned beyond the ends of said guide slot to support the axes, indicated 41 and 42, of said rollers 32 and 33, and said outer portions and their rollers are yieldingly held in spaced relation to the base of the guide slot 35 by mechanism consisting, in the instance of each arm, of a pin the head 43 of which engages the adjacent edge of an intermediate portion of an arm 37 and 38, as the case may be, and the body 44 of which is arranged in a concavity 45 at the base of said guide slot and housing a coil spring 46 surrounding said body and engaging beneath the inner shoulder of said head to hold said pin outwardly of said concavity and in pressing engagement with the corresponding arm. As will be clear from Fig. 1, pivotal movement of the arms 37 and 38 in direction toward the open side of the guide slot 35 is limited by engagement of the inner parts of the bifurcated portions of said arms with the ends of the spaced walls of the guide slot. The arrangement is such that the coil springs 46 normally hold the rollers 32 and 33 in spaced relation to the rollers of the sets 26 and 27 to situate the outer peripheral surfaces of said opposite rollers at distance apart too great to allow insertion of the apparatus in a pipe to be worked upon, it being necessary to urge the rollers 32 and 33 inwardly toward the frame or unit 13 and against the action of the coil springs 46 before making the entry. Thus said coil springs are placed under tension when the apparatus is in the pipe to be capable of yieldingly urging the rollers 28 and 29 against the internal surface of said pipe and of positioning the cutters into operative engagement with the longitudinal width or strip 11.

Any convenient means may be employed to propel the apparatus through the pipe, as, for example, a rack a fragment 47 of which is disclosed as desirably rigidly secured to the frame or unit to prevent turning movement of the apparatus in the pipe as the rollers travel along. The rack 47, or other feeding means, may be advanced in any convenient manner.

In practice, it is ordinarily necessary to feed the present apparatus but a single time through a relatively long pipe to effect removal of the flash therefrom. Preferably, the feeding is accomplished in some manner insuring that the removed chips will not interfere with proper engagement of the rollers with the internal surface of the pipe or impede the travel ahead of said rollers. For example, considering the pipe of Fig. 1 as horizontally situated, the removed chips fall to the location at the bottom of Fig. 2, clear of the rollers, and considering said pipe of Fig. 1 as vertically situated, said removed chips fall away from the cutters and vertically out of the pipe, in direction away from the mechanism for driving the rack 47 and opposite that in which the cut is being made.

Having thus described my invention, what I claim as new and desire to secure by Letters Patent of the United States, is:

1. An apparatus for removing obstructions from a longitudinal strip of the internal surface of a tubular member comprising a carriage adapted to be propelled through said tubular member, a shaft journaled in said carriage parallel with said longitudinal strip, cutters mounted on said shaft, a guide slot in said carriage opposite the axis of said shaft, oppositely disposed bifurcated arms pivoted in said guide slot, rollers journaled in the bifurcated portion of said arms, a pair of rollers mounted on said carriage adjacent the opposite ends of said shaft, resilient means mounted in said carriage and adapted to engage said arms to force said rollers into engagement with the walls of said tubular member.

2. An apparatus for removing obstructions from a longitudinal strip of the internal surface of a tubular member comprising a carriage adapted to be propelled through the tubular member, rollers rotatably mounted on said carriage, and adapted to engage the walls of the tubular member on the opposite sides of the longitudinal strip, the periphery of said rollers having a concentricity substantially that of the internal walls of the tubular member, additional rollers pivotally mounted on said carriage and adapted to engage the wall of said tubular member opposite said longitudinal strip, resilient means for causing said rollers to yieldably engage the walls of said tubular member, and cutting means for removing the obstructions on the longitudinal strip as said carriage advances.

3. An apparatus for removing obstructions from a longitudinal strip of the internal surface of tubular articles comprising a carriage adapted to be propelled through said tubular article, angular oppositely disposed stub shafts adjacent the ends of said carriage spanning said longitudinal strip, supporting rollers mounted on one end of said stub shafts and adapted to engage the internal walls of the tubular article adjacent said longitudinal strip, the periphery of said rollers having a concentricity of that of the internal surface of the tubular article, a rotary cutting element arranged between said supporting rollers, rollers pivotally mounted on said carriage and adapted to engage the internal wall of the tubular article at points opposite said longitudinal strip, and means forcing said roller into yieldable engagement with the internal walls of said tubular article.

4. Apparatus for removing obstructions from a longitudinal strip of the internal surface of a tubular member, comprising a carriage adapted to be propelled through a tubular member, a cutter journalled on the carriage and operative to engage and remove obstructions on the strip of the internal surface, means for operating the cutter, four rollers journalled on the carriage in symmetrical relation to the cutter for engaging the inner surface of the tubular member to limit the depth of cut, and two rollers resiliently mounted on the carriage at the ends thereof to engage the internal surface of the tubular member at positions diametrically opposite the strip being worked on for resiliently biasing the cutter into engagement with the obstructions to be removed.

5. Apparatus for removing obstructions from the internal surface of a tubular member, comprising a carriage adapted to be propelled through the tubular member, a cutter rotatably mounted on the carriage and disposed to engage and remove obstructions from the internal surface of the tubular member, means for actuating the cutter, a plurality of rollers journaled on the carriage in symmetrical relation to the cutter for engaging the inner surface of the tubular member to control the depth of the cut made by the cutter, and rollers resiliently mounted on the carriage in spaced relation to engage the internal surface of the tubular member at positions substantially opposite the portion which is being operated upon by the cutter to bias the cutter into engagement with the obstructions to be removed.

6. Apparatus for removing obstructions from the internal surface of a tubular member, comprising a carriage adapted to be propelled through the tubular member, rotary cutters journaled on the carriage and disposed to engage and remove obstructions from the internal surface of the tubular member, a drive for actuating the cutter, a plurality of rollers disposed on the carriage in symmetrical relation to the cutter to engage the inner surface of the tubular member and control the depth of the cut made by the cutter, and rollers resiliently mounted on the carriage in spaced relation to engage the internal surface of the tubular member diametrically opposite the portion being worked upon to bias the cutter into engagement with the obstructions to be removed to effect an even cut during the operation.

In testimony whereof I have signed my name at Milwaukee, Wisconsin, this 11th day of February, 1928.

FRED H. WHITMAN.